US005555131A

United States Patent [19]
Horton

[11] Patent Number: 5,555,131
[45] Date of Patent: Sep. 10, 1996

[54] OBJECTIVE LENS SYSTEM FOR ENDOSCOPE

[75] Inventor: Richard F. Horton, Los Lunas, N.M.

[73] Assignee: Symbiosis Corporation, Miami, Fla.

[21] Appl. No.: 330,188

[22] Filed: Oct. 27, 1994

[51] Int. Cl.$^6$ .................................................. G02B 21/02
[52] U.S. Cl. ............................................ 359/661; 359/794
[58] Field of Search ............................ 359/656, 657,
359/658, 659, 660, 661, 784, 785, 786,
787, 788, 789, 790, 791, 792, 793, 794,
795, 708, 663, 713, 714, 715, 716

[56] References Cited

U.S. PATENT DOCUMENTS

| | | | |
|---|---|---|---|
| 3,257,907 | 6/1966 | Hopkins | 88/57 |
| 4,168,882 | 9/1979 | Hopkins | 350/54 |
| 4,403,837 | 9/1983 | Nakahashi | 350/465 |
| 4,432,832 | 2/1984 | Fantone | 156/630 |
| 4,575,195 | 3/1986 | Hoogland | 350/432 |
| 4,662,725 | 5/1987 | Nisioka | 350/432 |
| 4,664,486 | 5/1987 | Landre et al. | 350/414 |
| 4,674,844 | 6/1987 | Nishioka et al. | 350/469 |
| 4,693,568 | 9/1987 | Takahashi | 350/469 |
| 4,721,372 | 1/1988 | Yokota | 350/464 |
| 4,723,843 | 2/1988 | Zobel | 350/573 |
| 4,784,118 | 11/1988 | Fantone et al. | 128/6 |
| 5,296,971 | 3/1994 | Mori | 359/716 |
| 5,321,457 | 6/1994 | Imaizumi | 354/222 |
| 5,327,283 | 7/1994 | Zobel | 359/434 |
| 5,341,240 | 8/1994 | Broome | 359/435 |
| 5,359,453 | 10/1994 | Ning | 359/435 |
| 5,359,456 | 10/1994 | Kikuchi | 359/654 |
| 5,369,377 | 10/1994 | Kamo | 354/222 |

*Primary Examiner*—Georgia Y. Epps
*Assistant Examiner*—Dawn-Marie Bey
*Attorney, Agent, or Firm*—David P. Gordon

[57] ABSTRACT

An objective lens system is provided and includes a spherical sapphire lens element, an aspheric first polymeric material lens element, and an aspheric second polymeric material lens element, all of which are axially aligned. The sapphire lens element is coupled to the first polymeric material lens element to form a meniscus shaped air lens element. When inserted as a component of an endoscope, the planar surface of the sapphire lens forms a robust outer distal window at the distal end of the endoscope and the flat surface of the second polymeric material lens element is attached to the relay lens system of the endoscope. The initial image of the observed area formed at the proximal end of the objective lens system is "buried" in a higher index medium than air thus allowing for easier coupling to a relay lens system leading to lower overall f/numbers. The dissimilar indices and dispersion qualities of the elements of the objective lens design and air gaps therebetween provide an improved correcting means for chromatic and geometric aberrations, and thus a higher overall quality optical image. Embodiments disclosed allow for direct coupling to a monolithic plastic relay lens.

19 Claims, 7 Drawing Sheets

OBJECTIVE LENS SYSTEM FOR ENDOSCOPE

This application is related to U.S. Ser. No. 08/330,369 entitled "Monolithic Relay Lens System Particularly Suited For Use In An Endoscope" (Docket No. SYM-133) which are filed on even date herewith and are hereby incorporated by reference in their entireties herein.

BACKGROUND OF THE INVENTION

1. Field of the invention

This invention relates broadly to endoscopes and laparoscopes. More particularly, this invention relates to objective lens systems for endoscopes and laparoscopes.

2. State of the Art

Endoscopes are optical systems which are well known in the art to permit observation of otherwise inaccessible areas within the human body without the use of excessive surgery. Besides minimizing the invasiveness of the surgery, endoscopes provide the advantage that, depending on the optical resolution of the endoscope, the taking of biopsy samples for later laboratory analysis may be unnecessary where direct endoscopic optical diagnosis is sufficient. Endoscopes which are specifically used to examine the peritoneal cavity (pertaining to the abdominal and pelvic cavities) of a patient are referred to as laparoscopes.

Structurally, endoscopes generally include an airtight and waterproof elongated tube having a distal end with an objective lens which is placed within the body cavity being examined and a proximal end with an eyepiece for viewing. The elongated tube includes a relay lens system between the objective lens and the eyepiece. The function of the objective lens is to form an image at the distal end of the tube. The function of the relay lens system is to take the image formed at the distal end of the tube and to transmit the image to the proximal end of the tube. The function of the eyepiece is to permit an observer to observe the image which is transmitted to the proximal end of the tube.

The objective lens is usually a relatively short focal length, wide angle lens situated at the distal end of the relay lens system behind a water and air proof "window" of a very durable optical material. The objective lens is typically made of at least two or more spherical lens elements which incorporate corrective means for the various chromatic and geometric (spherical, field curvature, astigmatic, coma) aberrations inherent in lenses. It is very important that the objective lens form an accurate and bright an image of the observed area. The image formed by the objective lens will be reimaged by the relay lens system several times before it is viewed at the eyepiece of the endoscope. Since reimaging will unavoidably degrade the image to some extent, the objective lens must produce the best image possible.

Such a high quality image is not easily produced due to several imaging problems present within conventional lens systems. The first problem relates to the image brightness of an optical system. The image brightness of an optical system is affected by the shape, composition and size of its lens elements. The smaller the focal length to diameter ratio of an optical system, the faster the system will be and the brighter the transmitted image will appear. This ratio is also referred to as the f/number. In laparoscopic optical systems, the f/number is usually defined by the elements following the objective, such as the relay system. The image brightness is also affected by transmission losses caused by light absorption and scattering within the lens elements. An example of absorption loss can be illustrated by using a lens with a slight amber cast to form an image from an object. In such a lens, any blue light originating from the original object would be absorbed by the amber colored lens, thus causing a chromatic distortion in the formed image as well as a reduction in brightness. Scattering loss occurs as the result of the presence of incompletely or improperly polished lens elements in the optical system. In such a case, the lens elements may not absorb the light directly, but instead scatter it out of the intended ray paths to be absorbed by the walls of the system or simply lost. Scattering can also be the cause of poor contrast in an image as a result of the flooding of the image plane with unwanted and out of focus light.

A second common problem associated with conventional lenses is that of image aberrations, such as third order sphericals, comas and astigmatisms, all of which reduce the sharpness of the formed image. Additionally, field curvature may be such that the image cannot viewed in its entirety from any one angle, that is be accommodated over an angular extent all at the same time by a normal eye, although the eye could focus on different areas in the image at different times.

A third problem found in conventional lens system is distortion. Most conventional lenses exhibit a small amount of radial distortion. Radial distortion occurs when the radial image scale varies as view angle goes from the center of the field of view to the edge of the field of view. Radial distortion is the cause for the "fish eye" effect produced by extremely wide field lenses.

Another problem in designing an objective lens system is that a very durable as well as air/water proof element is needed as part of the objective lens system to act as a window between the area being observed and the inside of the endoscope. This element must usually have a flat surface facing the direction of area to be observed in order to avoid any change in optical power when the endoscope is immersed in a fluid.

Known objective lens designs are often costly to manufacture due to the materials used and the difficulties of accurately fabricating these materials to optical tolerances. Specifically, any non-polymeric lens element is very costly to manufacture and may not necessarily be adequately temperature resistant or air and water resistant. In addition, the prior art fails to disclose temperature resistant objective lens elements which could be used in an autoclavable endoscope design.

SUMMARY OF THE INVENTION

It is therefore an object of the invention to provide an objective lens system for an endoscope which is simple in design and easy to manufacture.

It is also an object of the invention to provide an objective lens system for an endoscope having inexpensive components.

It is another object of the invention to provide an objective lens system for an endoscope having a high optical quality in the relayed image.

It is further an object of the invention to provide an objective lens system which has a highly durable flat surface element at the distal end.

It is also an object of the invention to provide an objective lens system which interfaces directly with a monolithic and/or plastic relay lens system.

It is a further object of the invention to provide an objective lens system for an endoscope with small f/numbers that is consistent with the relay system of the endoscope.

Another object of the invention is to provide an objective lens system for an endoscope having lens components made up of two types of polymeric lenses and a sapphire lens.

An additional object of the invention is to provide an objective lens system for an endoscope which is autoclavable.

In accordance with the objects of the invention, which will be discussed in detail below, a first embodiment of an objective lens system is provided and includes a plano-convex spherical sapphire lens element, a concavo-plano aspheric polymeric lens element, and a convexo-plano aspheric polymeric lens element, where the sapphire lens element and its convex surface and the aspheric polymeric lens element and its concave surface are arranged to form a meniscus shaped air lens or gap therebetween.

The aspheric surface of the concavo-plano polymeric lens element is axially aligned and facing the aspheric convexo-plano polymeric rod lens element such that a plano-concave shaped air lens or gap is formed between the two lens element. The concavo-plano and convexo-plano lens elements are made of two different polymeric materials with predetermined optical properties. The planar surface of the sapphire lens forms a robust outer distal window for an endoscope. When inserted as a component of an endoscope, the objective lens forms an image at the proximal end of the system which is then transmitted by a relay lens system for viewing at the eyepiece of the endoscope. In this embodiment, the image formed is "buried" in a higher index medium than air thus allowing for easier coupling to a relay lens system incorporating "rod" elements of the same index, and leading to lower overall effective f/numbers. For a given optical path length, a relay system operates at a lower effective f/number in index media higher air than it would if the path length were predominantly air. The dissimilar indices and dispersion qualities of the three elements of the objective lens design, the aspheric shapes of the lenses, and the air gaps therebetween, provide an improved correcting means for chromatic and geometric aberrations, and thus a higher overall quality optical image.

According to a second embodiment of the invention, an objective lens system is provided and includes a plano-convex spherical sapphire lens element, a concavo-convex aspheric polymeric lens element, a convexo-convex polymeric lens element, a concavo-convex optical cement lens element, and a concavo-plano aspheric polymeric lens elements. This embodiment is designed to link directly to one of the relay elements disclosed in the above mentioned U.S. patent application Ser. No 08/330,369 [SYM-133]. The concavo-convex polymeric lens element is made from a first polymeric material and the convexo-convex and concavo-plano polymeric lens elements are made from a second polymeric material. The planar surface of the sapphire lens forms a robust outer distal window for an endoscope, and the convex surface forms a meniscus shaped air lens with the concave surface of the concavo-plano first polymeric material lens element. The planar surface of the concavo-plano polymeric lens element is axially aligned and facing the convexo-convex second polymeric material lens element such that an air gap is formed between the two lens sections. The concavo-convex optical cement lens element is shaped by one of the convex surfaces of the convexo-convex second polymeric material lens element and the concave surface of the concavo-plano second polymeric material lens element. The cement lens is preferably made with VTC2 adhesive which is a UV curing plastic cement manufactured by Sommers. When inserted as a component of an endoscope, the objective lens forms an image at the proximal end of the system which is then transmitted by a relay lens system for viewing at the eyepiece of the endoscope. As in the first embodiment, the image formed is "buried" in a higher index media than air thus allowing for easier coupling to a relay lens system leading to lower overall effective f/numbers. The dissimilar indices and dispersion qualities of the five element objective lens design and air gaps therebetween provide an improved correcting means for chromatic and geometric aberrations, and thus a higher overall quality optical image.

In both embodiments, the objective lens system is of a simple design and uses relatively inexpensive parts. The two optically dissimilar polymeric material lens elements of the system can be mass produced using injection molding. Low temperature polymeric material combinations, such as polystyrene and acrylic, are most easily injection molded and may, together with the optical cement, be used to manufacture disposable and very inexpensive objective lens systems. On the other hand, where a temperature resistant, autoclavable endoscope is preferred, high temperature polymeric lens combinations, such as polycarbonate and TPX (polymethylpentene), manufactured by Mitsui, can be used. The sapphire lens is easily fabricated as it contains a flat surface and a spherical surface, thus not requiring difficult machining.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
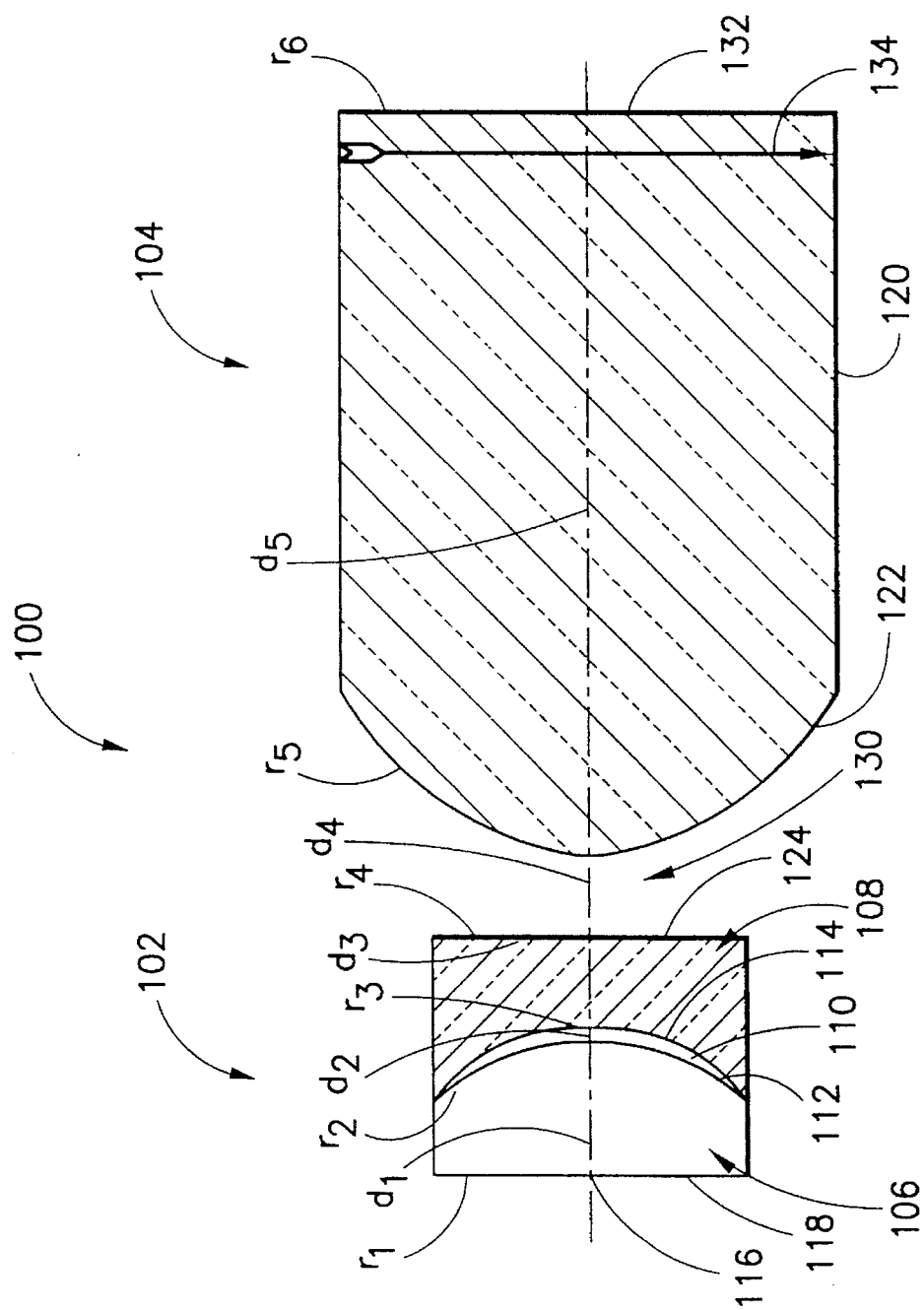
FIG. 1 is a detailed cross-sectional view of a first embodiment of the objective lens system of the invention.

Turning now to FIG. 1, a detailed cross-sectional view of a first embodiment of the objective lens 100 of the invention is shown. The objective lens 100 is cylindrical and generally includes a distal lens section 102 axially aligned with, and having a slightly smaller diameter than, a proximal lens section 104. The distal lens section 102 includes a spherical plano-convex sapphire lens element 106 and an aspheric concavo-plano polycarbonate lens element 108 coupled with the sapphire lens 106 such that a meniscus shaped air lens 110 is formed by the convex surface 112 of the sapphire lens and the aspheric concave surface 114 of the polycarbonate lens 108. The planar surface 116 of the sapphire lens 106 forms a robust outer distal window 118. The proximal lens section 104 includes a convexo-plano acrylic rod lens element 120 having a convex surface 122 facing the planar surface 124 of the polycarbonate lens element 108 of the distal lens section 102 and forming an air gap 130 therewith. The acrylic rod lens 120 further has a planar surface 132 which may be axially coupled to a relay lens system (not shown).

When inserted as a component of an endoscope, the distal end of the objective lens 100 system points in the direction of the area to be observed. The lens elements 106, 108, 120 of the system 100 form an image 134 at the proximal end of the acrylic rod lens 120 which is then transmitted by the relay lens system (not shown) for viewing at the eyepiece (not shown) of the endoscope. In this embodiment, the initially formed image 134 [surface] of the observed area is "buried" in the proximal end of the acrylic lens element 120. This burial of the image allows the light from the first image surface at 134 to continue on into a plastic relay without changing media, thus minimizing brightness losses due to reflection, refraction, etc. The dissimilar indices and dispersion qualities of the three components of the objective lens design (sapphire, polycarbonate, acrylic), aspheric surfaces, and air gaps therebetween provide an improved correcting means for chromatic and geometric aberrations, and thus a higher overall quality optical image. Furthermore, as the image 134 is buried in a higher index medium (acrylic) than air, the objective lens 100 can be coupled directly to a relay system at the planar surface 132 of the acrylic lens 120, allowing lower effective system f/numbers and a brighter image. The system f/number is limited by the lens system of the endoscope which follows the objective, and will be on the order of f/6 for the intended endoscopic use. The objective lens system described herein will not limit the f/number beyond f/6.

According to the preferred embodiment of the invention, the various dimensions of the rod lens element in FIG. 1 are as follows:

| First embodiment | | | | |
|---|---|---|---|---|
| Sapphire (106) | r1: ∞ | | | |
| | d1: 2.000 | | | n1: 1.768 |
| | r2: −2.665 | | | v1: 72.210 |
| Air (110) | d2: 0.10 | | | |
| Polycarbonate (114) | r3: −2.7121 | | | |
| | d3: .493 | k3: .269 | | n2: 1.585 |
| | r4: −101.19 | | | v2: 30.3 |
| Air (130) | d4: 0.200 | k4: 120.86 | | |
| Acrylic (120) | r5: 2.737 | | | |
| | d5: 6.029 | k5: −0.578 | | n3: 1.49 |
| | r6: ∞ | | | v3: 55.287 |

In the numerical data shown above, reference symbols d1 through d5 represent distances between the surfaces of each lens, reference symbols r1 through r6 represent radii of curvature of the respective lens surfaces, reference symbols n1 through n3 represent refractive indices of the respective lenses, reference symbols k3 through k5 represent conic constants for the surface, and reference symbols v1 through v3 represent Abbe's numbers of the respective lenses.

The objective lens system 100 is of a simple design and uses inexpensive parts. The polycarbonate lens 108 and the acrylic lens 120 are both easily manufactured using for example an injection molding process. Such a process allows for high volume and inexpensive manufacturing while still producing a relay lens system with high optical quality. The sapphire 106 lens is also easily fabricated as it does not contain any difficult to grind aspheric lens surfaces. The objective lens system is easily assembled using known techniques of molding plastic elements with integral spacers and laying the component parts in a V-shaped slot to axially align the elements.

Several variations in the compositions of the elements of the objective lens system 100 are available. In a first variation, a low temperature plastic having similar properties to polycarbonate, such as polystyrene, may be used instead of polycarbonate for the concavo-plano lens element 108. As a low temperature plastic, polystyrene is easier and less expensive to manufacture by an injection molding process than polycarbonate. Furthermore, as both polystyrene and acrylic are low temperature plastics, a objective lens system using the sapphire/polystyrene/acrylic combination will be an overall easier and less expensive system to manufacture by injection molding than the sapphire/polycarbonate/acrylic combination. In a second variation, the acrylic concavo-plano lens element 120 is replaced with a high temperature plastic lens element with similar optical properties, such as TPX (manufactured by Mitsui), to achieve a temperature resistant objective lens system that is usable in an autoclavable endoscope design. The sapphire/polycarbonate/TPX combination, although slightly more expensive to manufacture by injection molding than the low temperature objective lens combination, exhibits excellent imaging and thermal properties and is able to survive high temperatures such as those found in autoclave cycles.

Figure 2:
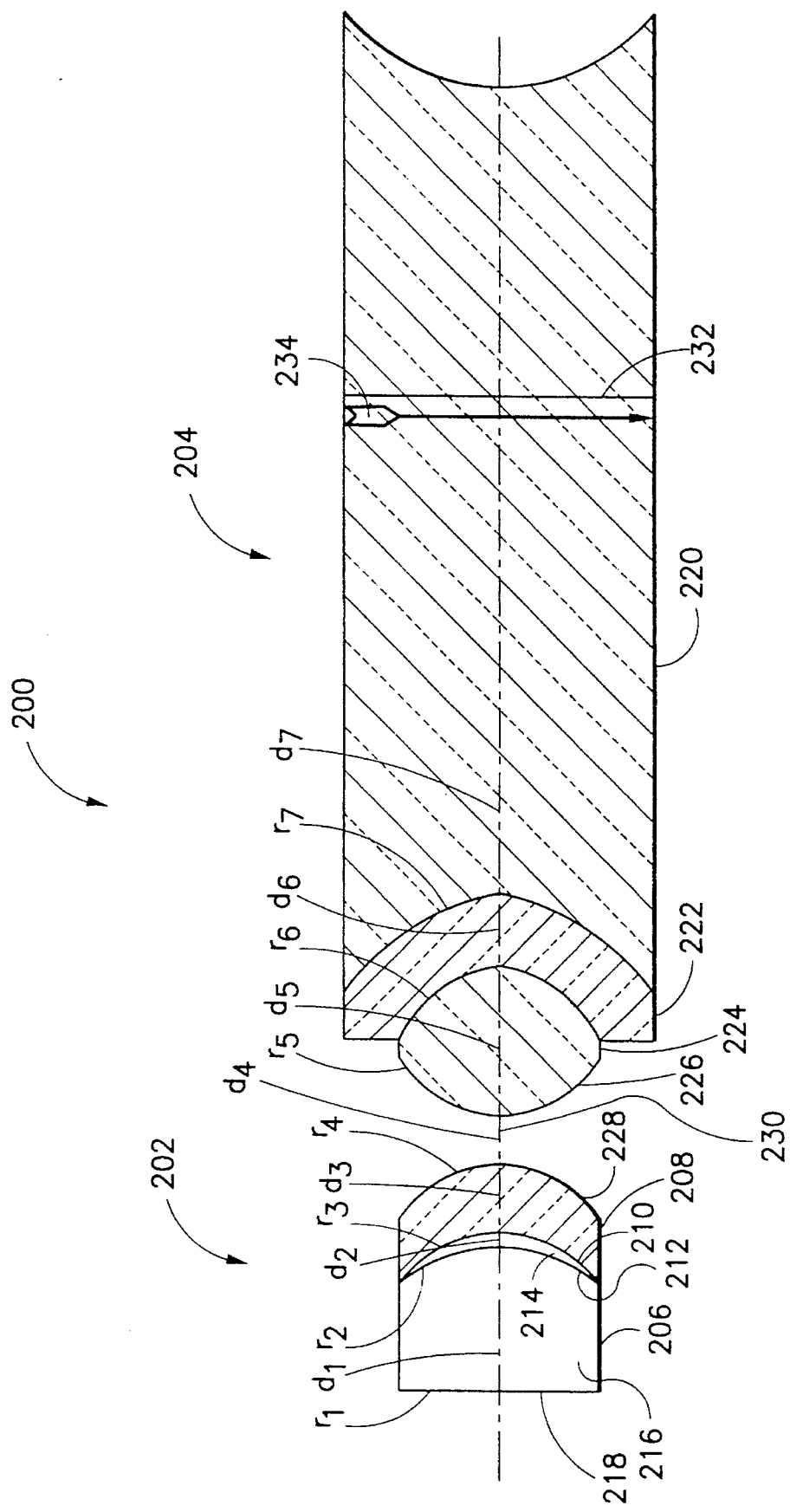
FIG. 2 is a cross-sectional view of a second embodiment of the objective lens system of the invention as a component of an endoscope, employing a monolithic plastic relay lens system.

Referring now to FIG. 2, a detailed cross-sectional view of a second embodiment of the objective lens 200 of the invention is shown. As in the first embodiment, the objective lens 200 is cylindrical and generally includes a distal lens section 202 axially aligned with, and having a slightly smaller radius than, a proximal lens section 204. The distal lens section 202 includes a spherical plano-convex sapphire lens element 206 and an aspheric concavo-convex polycarbonate lens element 208 coupled with the sapphire lens 206 such that a meniscus shaped air lens 210 is formed by the convex surface 212 of the sapphire lens and the concave surface 214 of the polycarbonate lens 208. The planar surface 216 of the sapphire lens 206 forms a robust outer distal window 218 for an endoscope (not shown). The proximal lens section 204 includes a concavo-plano TPX rod lens element 220, a concavo-convex VTC2 (manufactured by Sommers) optical cement lens element 222 and a convexo-convex TPX lens element 224 having a first convex surface 226 facing the convex surface 228 of the polycarbonate lens element 208 and forming an air gap 230 therewith. The acrylic rod lens 220 further has a planar surface 232 which may be axially coupled to a monolithic plastic relay lens system (not shown).

When inserted as a component of an endoscope, the distal end of the objective lens system 200 is placed in the cavity of the patient to be observed. The lens elements of the system form an image 234 at the proximal end of the acrylic rod lens 220 which is then transmitted by the relay lens system (not shown) for viewing at the eyepiece of the endoscope. In this embodiment, the initially formed image 234 [surface] of the observed area is "buried" in the proximal end of the acrylic lens element 232. The dissimilar indices and dispersion qualities of the four materials of the objective lens design (sapphire, VTC2 cement, polycarbonate, and TPX) and air gaps therebetween provide an improved correcting means for chromatic and geometric aberrations, and thus a higher overall quality optical image. Furthermore, as in the first embodiment of the invention, the image is buried in a higher index media (acrylic) than air, and the objective lens 200 can be coupled directly to a relay system at the planar surface 232 of the acrylic lens 220, allowing lower effective system f/numbers and a brighter image. In the preferred embodiment the system f/number is on the order of f/6 for the lens system of the endoscope which follows the objective lens system and the f/number of the entire endoscope is on the order of f/6.

| Second Embodiment | | | |
|---|---|---|---|
| Sapphire | r1: ∞ | | |
| | d1: 2.00 | | n1: 1.7683 |
| | r2: −2.50 | | v1: 72.21 |
| Air | d2: 0.338 | | |
| Polycarbonate | r3: −2.164 | k3: 0.078 | |
| | d3: 0.20 | | n2: 1.5855 |
| | r4: −5.065 | k4: −0.902 | v2: 30.30 |
| Air | d4: 0.488 | | |
| TPX | r5: 3.665 | k5: 1.424 | n3: 1.466 |
| | d5: 1.895 | | v3: 56.622 |
| VTC2 | r6: −0.8951 | k6: −1.4413 | n4: 1.5480 |
| | d6: 0.356 | | v4: 43.84 |
| TPX | r7: −3.36 | k7: −1.019 | n5: 1.466 |
| | d7: 3.000 | | v5: 56.622 |

The objective lens system 200 is of a simple design and uses inexpensive parts. The polycarbonate lens and the TPX lenses are both easily manufactured using for example an injection molding process. Such a process allows for high volume and inexpensive manufacturing while still producing a relay lens system with high optical quality. The sapphire lens is easily fabricated as it contains a flat surface and a spheric surface, thus not requiring difficult machining. The VTC2 concavo-convex optical cement lens element is shaped by one of the convex surface of the TPX convexo-convex lens element and the concave surface of the concavo-plano TPX rod lens elements.

Since polycarbonate and TPX are high temperature plastics and the sapphire lens and optical cement lens elements are also temperature resistant, the present objective lens composition is usable in an autoclavable endoscope design. Other materials are available where the objective lens system need not be temperature resistant. For example, a low temperature plastic with similar properties to polycarbonate, such as polystyrene, may be used instead of polycarbonate for the concavo-convex lens element 208 of the distal lens section 202. Similarly, another low temperature plastic with similar properties to TPX, such as acrylic, may be used instead of TPX for the convexo-convex and the concavo-plano lens elements 224, 220 of the proximal lens section 204. Being low temperature plastics, polystyrene and acrylic are easier and less expensive to manufacture by an injection molding process than polycarbonate and TPX. Furthermore, as both polystyrene and acrylic are low temperature plastics, an objective lens system using the sapphire/polystyrene/acrylic combination will be an easier and less expensive system to manufacture by injection molding than the sapphire/polycarbonate/acrylic combination.

The dimensions of an alternative second embodiment of the objective lens system 200 illustrated in FIG. 2 is further described below. The sapphire/polystyrene/acrylic alternative is arranged in substantially the same manner as the sapphire/polycarbonate/TPX lens system described above but with polystyrene being substituted for polycarbonate and acrylic being substituted for TPX. When this substitution is made, the dimensions of the lens elements is slightly different as listed in the table below:

| (sapphire/polystyrene/acrylic alternative) | | | |
|---|---|---|---|
| Sapphire | r1: ∞ | | |
| | d1: 2.00 | | n1: 1.7683 |
| | r2: −2.520 | | v1: 72.210 |
| Air | d2: 0.100 | | |
| Polystyrene | r3: −2.340 | k3: −.0053 | |
| | d3: 0.200 | | n2: 1.5905 |
| | r4: −5.100 | k4: −4.0823 | v2: 30.853 |
| Air | d4: 0.488 | | |
| Acrylic | r5: 4.720 | k5: 2.0695 | n3: 1.4917 |
| | d5: 1.895 | | v3: 55.287 |
| VTC2 | r6: −1.130 | k6: −2.1548 | n4: 1.5480 |
| | d6: 0.356 | | v4: 43.840 |
| Acrylic | r7: −3.28 | k7: −1.029 | n5: 1.4917 |
| | d7: 3.505 | | v5: 55.287 |

Figure 3:
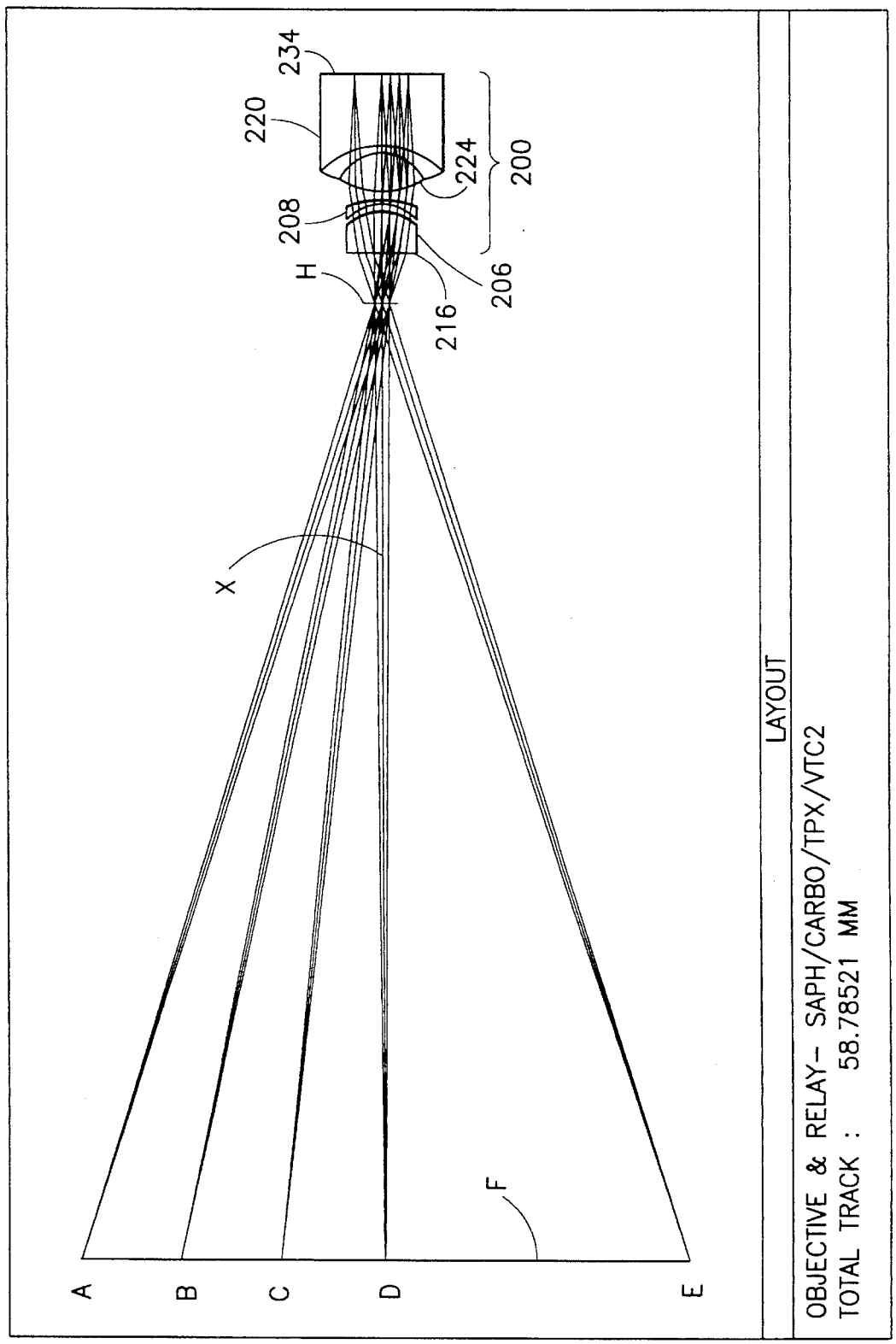
FIG. 3 is an optical layout illustrating the ray paths and image orientation through the objective lens system of the second embodiment of the invention.

Turning now to FIG. 3, ray trace diagram of the second embodiment of the invention incorporating Sapphire, Polycarbonate, TPX and VTC2 polymeric lens elements is shown. Light rays emanating from object points A, B, C, D and E are traced through the objective lens 200 and the relay lens system (not shown). Points A, B, C, D, and E are located on the same object plane F which is situated at a distance of 50 mm from the surface 216 of the first lens element 206 of the object lens G. Point A is located at +15 mm from the lens axis X, B is at +10 mm, C is at +5 mm, D is on the axis and E is at −15 mm. The system as described operates at an effective f/number of 6.5, with an effective focal length of 4.5 mm. The working entrance pupil H is merely the image of the inside of the relay lens. Note that the working entrance H is located approximately 2.5 mm in front of the first lens element 206. The object plane F is formed into a first inverted image of F at 234.

Figure 4:
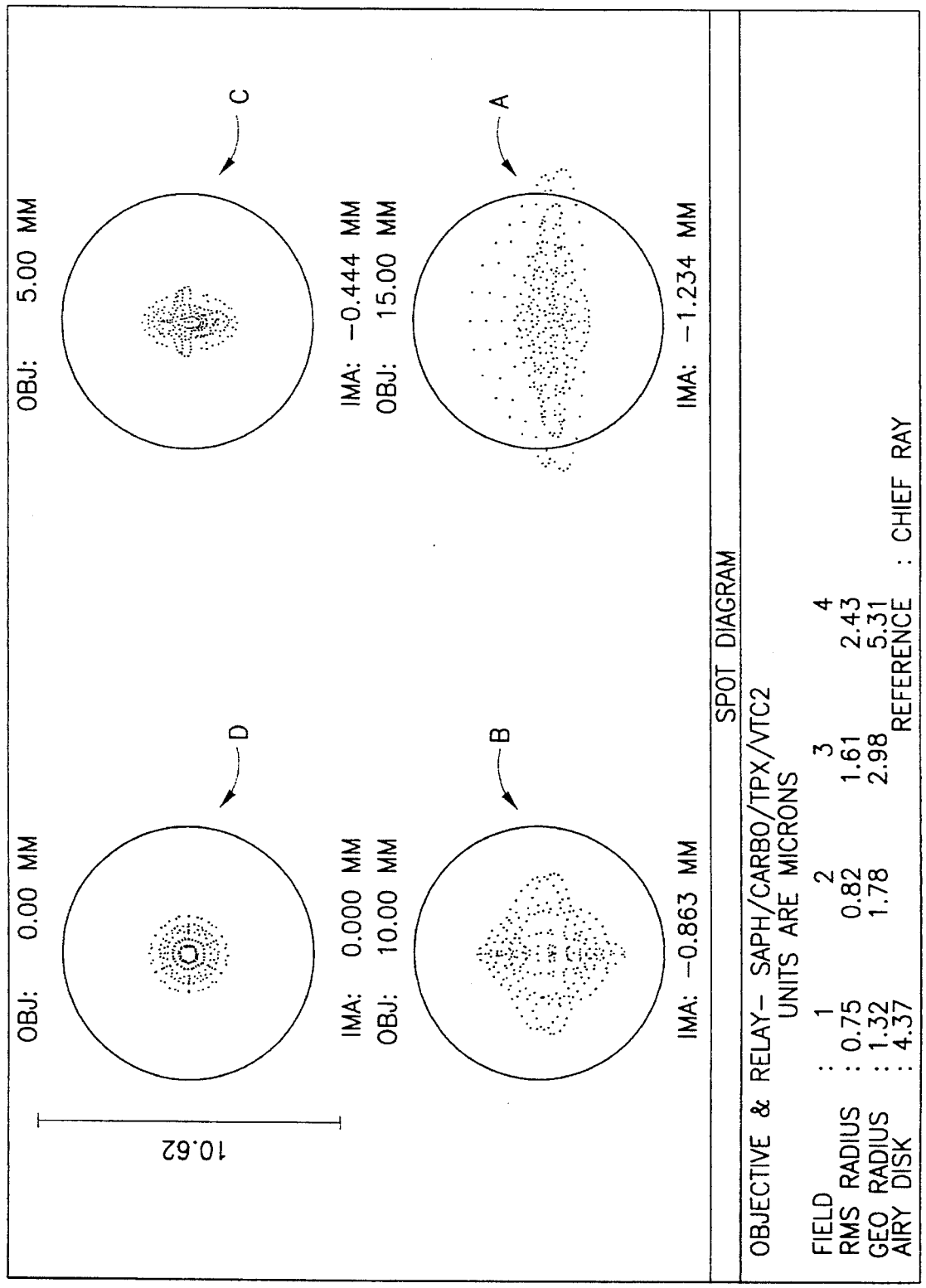
FIG. 4 shows raytrace data in the form of spot diagrams of the second embodiment of the invention.
Figure 5:
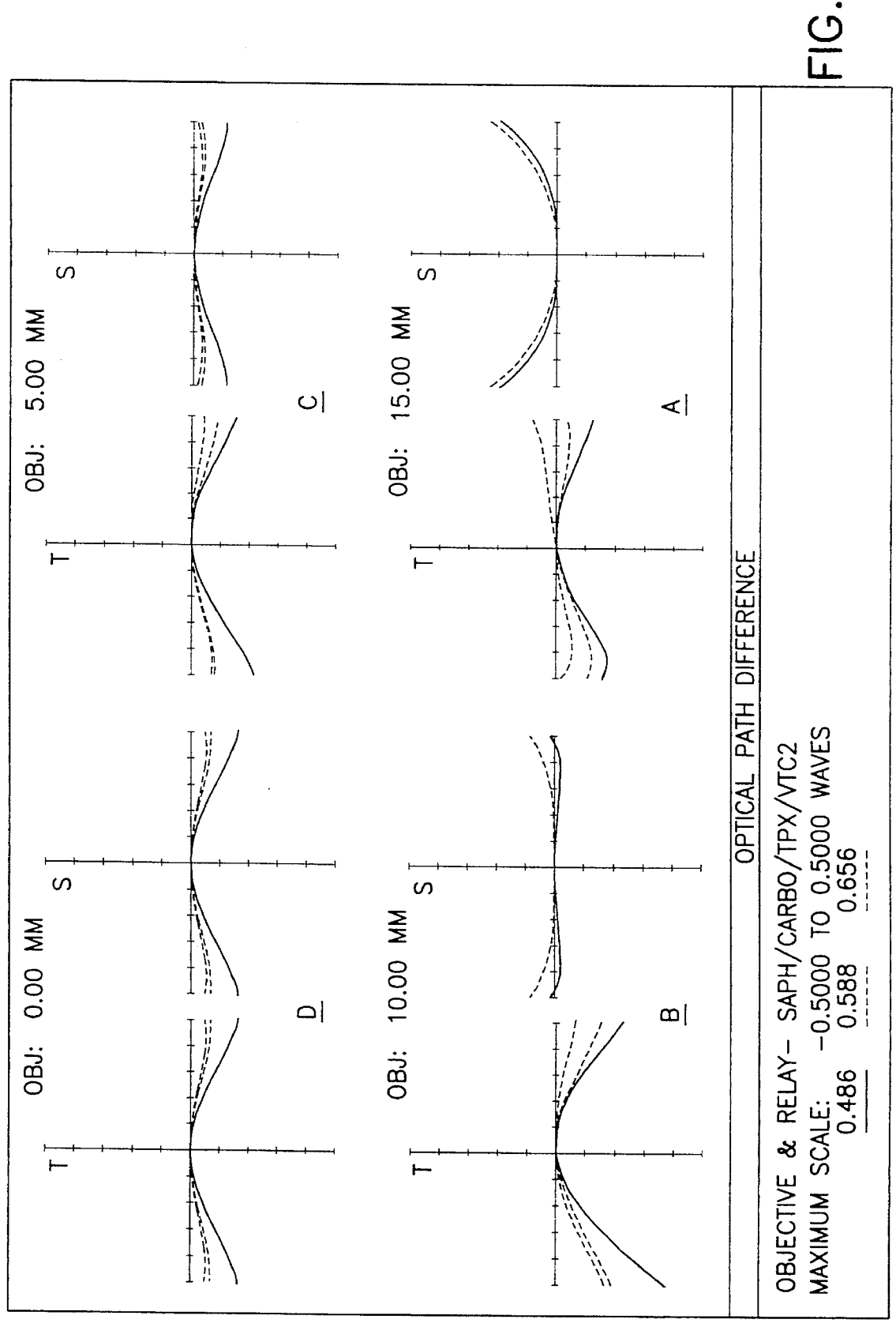
FIG. 5 shows raytrace data in the form of optical path difference diagrams of the second embodiment of the invention.
Figure 6:
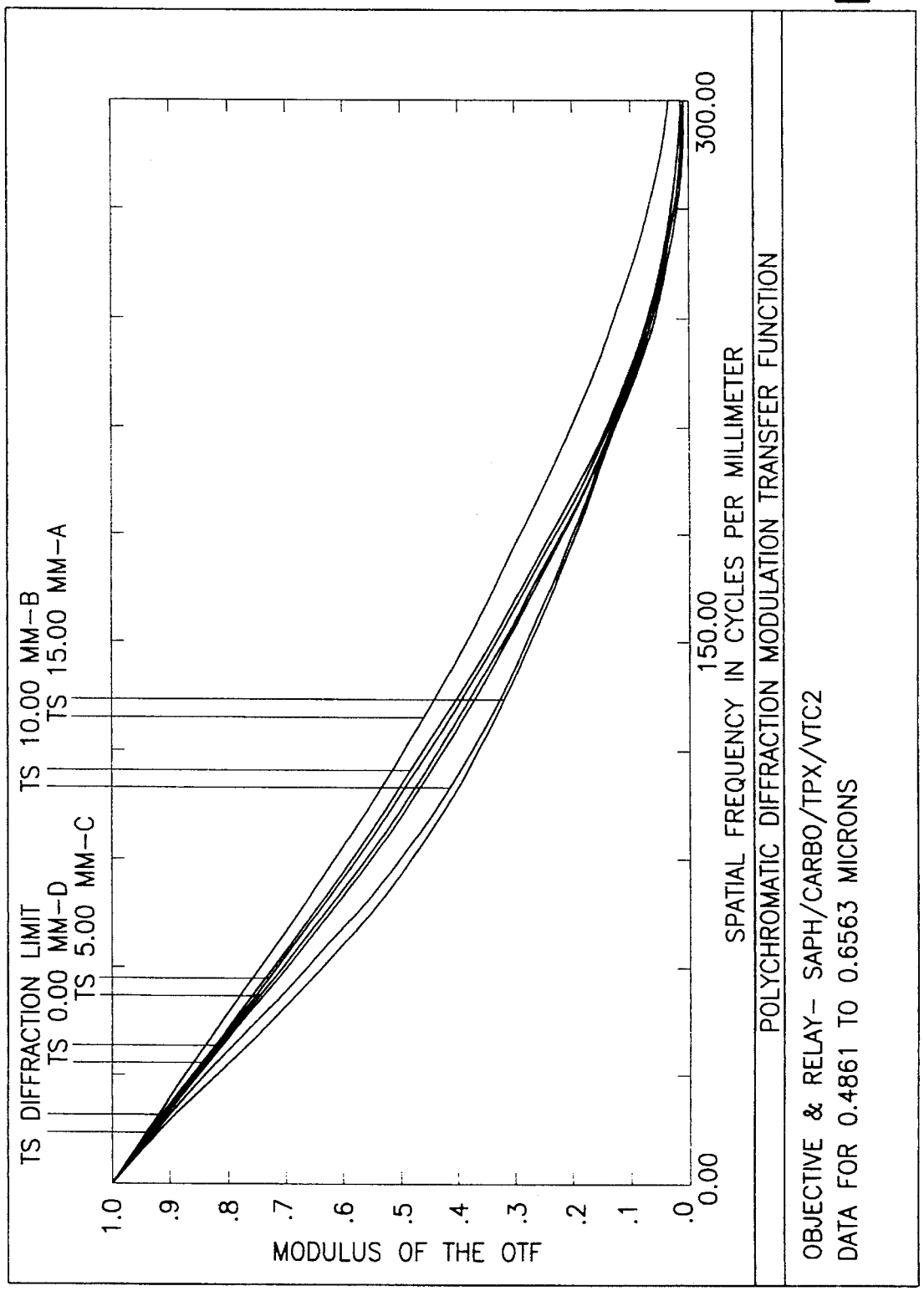
FIG. 6 shows polychromatic diffraction modulation transfer function curves for the second embodiment of the invention.
Figure 7:
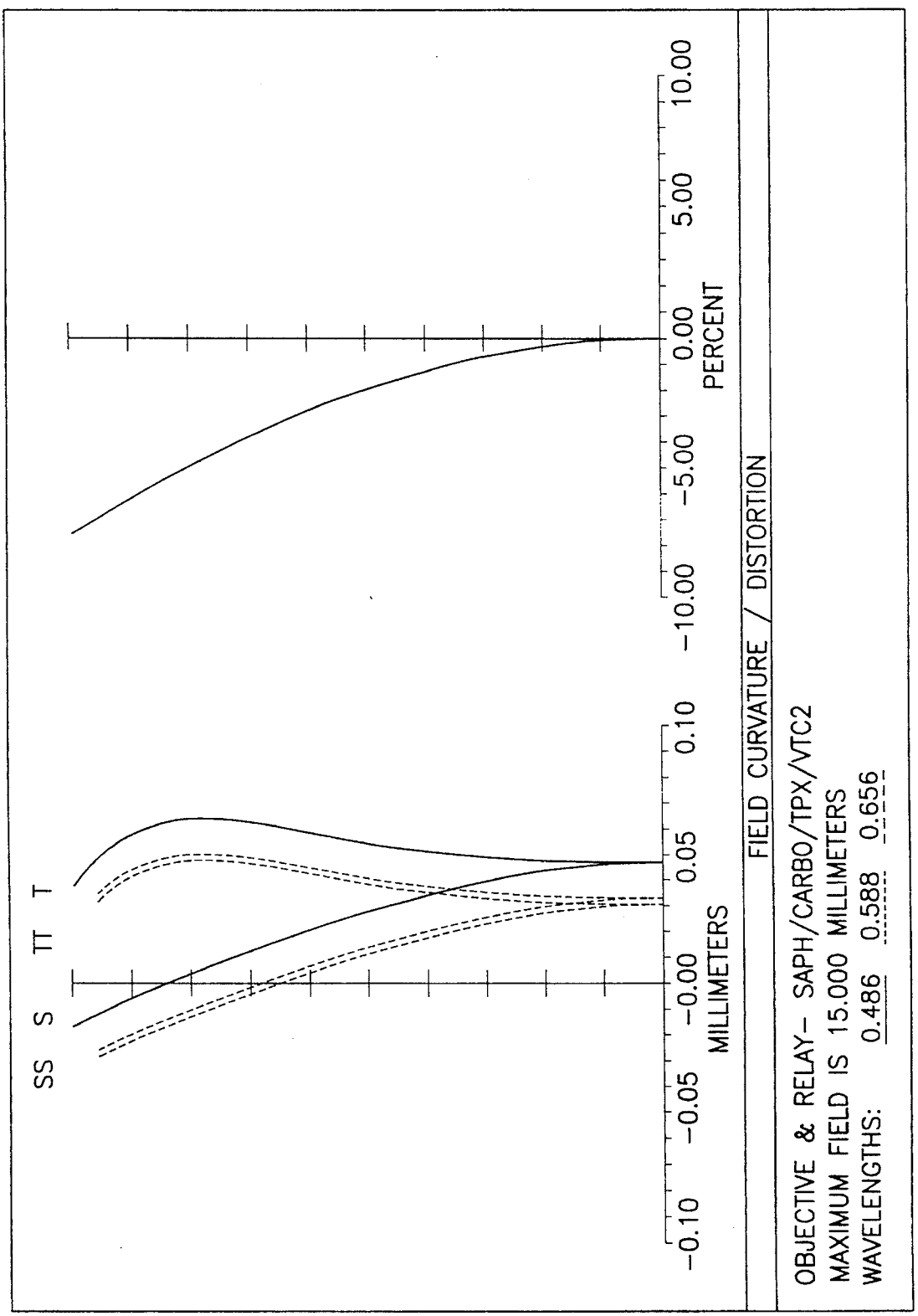
FIG. 7 shows field curvature and distortion plots for the second embodiment of the invention.

Referring generally to FIGS. 4–7, various raytrace, diffraction and curvature data for the second embodiment are shown. FIG. 4 shows spot diagrams of field points A, B, C and D as shown in FIG. 3, situated at 15 mm, 10 mm, 5 mm, and 0 mm respectively from the objective lens axis X (see FIG. 3). It will be observed that almost all of the rays traced fall within the Airy Disk radius of 4.37 Microns. FIG. 5 shows the optical path difference (OPD) curves for the same four field points. It will be noted that the OPD's are well within ¼ wave for all four field points. FIG. 6 shows the polychromatic diffraction modulation transfer function curves for the above four field points. For all four field points, the system has very close to diffraction limited performance. FIG. 7 shows field curvature and distortion plots for the objective lens system. As the percent deviation from normal diagram indicates, the lens system of the invention displays excellent optical performance.

It will be appreciated by those skilled in the art that in an endoscopic instrument, the objective lenses of the invention will be coupled to the distal ends of relay lens systems. Preferred relay lens systems are disclosed in the related applications entitled "Relay Lens System For Endoscope" and "Monolithic Relay Lens System Particularly Suited For Use In An Endoscope" (SYM-131, SYM-133), which have been incorporated by reference herein.

There have been described and illustrated herein preferred embodiments of objective lens systems having multiple lens elements for endoscopes and laparoscopes. While particular embodiments of the invention have been described, it is not intended that the invention be limited thereto, as it is intended that the invention be as broad in scope as the art will allow and that the specification be read likewise. Thus, while particular polymers for the polymeric lens elements of the objective lens system have been disclosed, it will be appreciated that other polymers with similar optical properties can be used. Furthermore, while a particular type of plastic optical cement has been disclosed in the second embodiment of the invention, it will be understood that any other optical cement with similar properties can be used. Also, while particular dimensions and indices of refraction and reflection of the objective lens system have been disclosed, it will be recognized that other dimensions and indices may be also be used. Moreover, while particular configurations have been disclosed in reference to the number of corrective lens element in the objective lens system, it will be appreciated that other configurations could be used as well. In addition, while a particular relay lens system for an endoscope has been described, it will be appreciated that other suitable relay lens systems can be used with the objective lens system of the invention. Furthermore, while particular methods of manufacture and assembly have been disclosed for the objective lens system, it will be understood that any other suitable method can be similarly used. It will therefore be appreciated by those skilled in the art that yet other modifications could be made to the provided invention without deviating from its spirit and scope as so claimed.

I claim:

1. An objective lens system for forming an image at the distal end of an endoscope to be transmitted by a relay lens system to an eyepiece at the proximal end of the endoscope, the objective lens system comprising:
   a) a distal lens section having
      1) a sapphire spheric plano-convex lens element with a planar surface and a convex surface,
      2) a first polymeric material aspheric lens element with a concave surface, and
      3) an air meniscus lens element formed by said spheric sapphire lens element and said first polymeric material lens element, said planar surface of said sapphire lens element forming a distal end of said objective lens element;
   b) a proximal lens section having a polymeric material aspheric rod lens element composed of a material different from that of which said first polymeric material aspheric lens element is composed, said rod lens element having a planar surface, said planar surface of said rod lens element forming a proximal end of said objective lens system,
   c) an air gap formed by said first polymeric material aspheric lens element and said proximal lens section.

2. An objective lens system according to claim 1, wherein:
   said first polymeric material aspheric lens element has a planar surface in addition to a concave surface,
   said air meniscus lens element is formed by said convex surface of said spheric sapphire lens element and said concave surface of said first polymeric material aspheric lens element,
   said rod lens element has a convex surface in addition to a planar surface,
   said air gap is formed by said planar surface of said first polymeric material aspheric lens element and said convex surface of said rod lens element.

3. An objective lens system according to claim 2, wherein:
   said first polymeric material aspheric lens element is a polycarbonate lens.

4. An objective lens system according to claim 3, wherein:
   said rod lens element is a TPX lens.

5. An objective lens system according to claim 2, wherein:
   said first polymeric material aspheric lens element is a polystyrene lens.

6. An objective lens system according to claim 5, wherein:
   said rod lens element is an acrylic lens.

7. An objective lens system according to claim 2, wherein:
   said lens elements have f/numbers on the order of f/6.

8. An objective lens system according to claim 2, wherein:
   said first polymeric material aspheric lens element and said rod lens element are comprised of a low dispersion polymeric material.

9. An objective lens system according to claim 1, wherein:
   said air meniscus lens element is formed by said convex surface of said spheric sapphire lens element and said concave surface of said first polymeric material aspheric lens element,
   said first polymeric material aspheric lens element has a convex surface in addition to a concave surface,
   said proximal lens section further includes a polymeric material aspheric convexo-convex lens element with a first convex surface and a second convex surface, and an aspheric optical cement concavo-convex lens element with a concave surface and a convex surface,
   said rod lens element has a concave surface in addition to a planar surface,
   said air gap is formed by said convex surface of said first polymeric material aspheric lens element and said first convex surface of said polymeric material convexo-convex lens element.

10. An objective lens system according to claim 9, wherein:
    said first polymeric material aspheric lens element is a polycarbonate lens.

11. An objective lens system according to claim 10, wherein:
    said polymeric material aspheric convexo-convex lens element and said rod lens element are TPX lenses.

12. An objective lens system according to claim 10, wherein:
    said aspheric optical cement concavo-convex lens element is a UV curing plastic cement lens.

13. An objective lens system according to claim 9, wherein:
    said first polymeric material aspheric lens element is a polystyrene lens.

14. An objective lens system according to claim 13, wherein:
    said polymeric material aspheric convexo-convex lens element and said rod lens element are acrylic lenses.

15. A relay lens system according to claim 14, wherein:
    said aspheric optical cement concavo-convex lens element is a UV curing plastic cement lens.

16. An objective lens system according to claim 10, wherein:
    said lens elements have f/numbers on the order of f/6.

17. An objective lens system according to claim 9, wherein:
    said first polymeric material aspheric lens element, said polymeric material aspheric convexo-convex lens element and said rod lens element are comprised of a low dispersion polymeric material.

18. An objective lens system according to claim 1, wherein:
    the f/number of the lens system is on the order of f/6.

19. An objective lens system according to claim 9, wherein:
    the f/number of the lens system is on the order of f/6.

* * * * *